April 4, 1967     W. E. GRITT     3,312,117
POWER-TRANSMISSION CHAIN LINKS
Filed Sept. 1, 1964
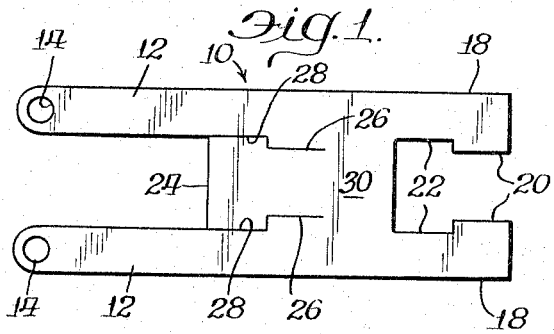
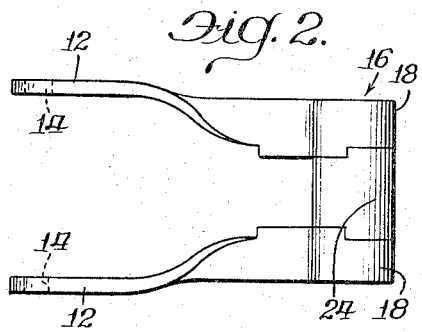
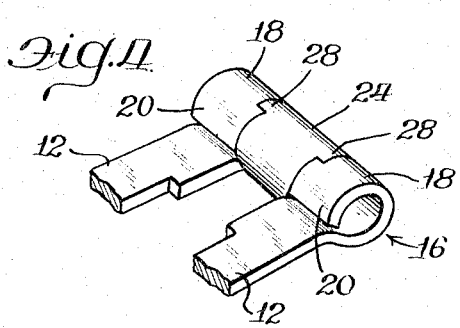
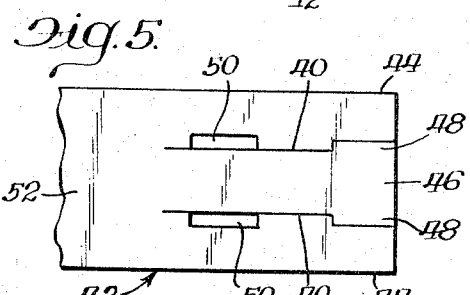
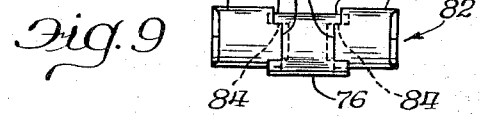
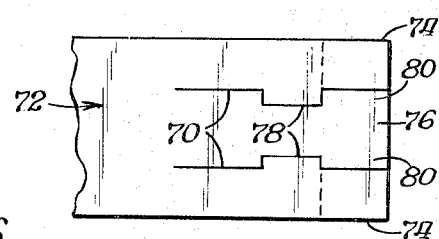
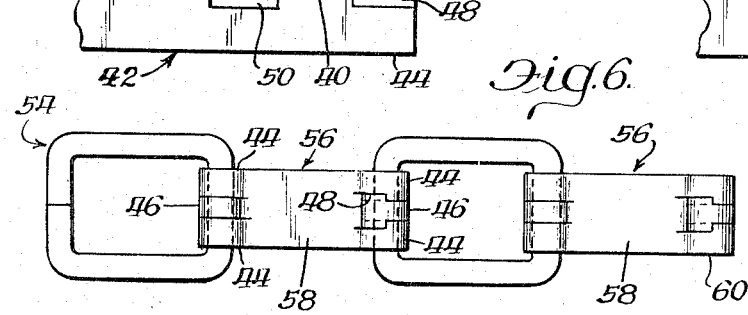
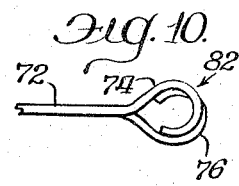
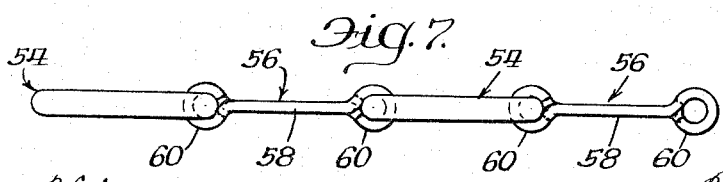
Inventor:
William E. Gritt
By: Walter S. Schlegel, Jr.
Atty.

United States Patent Office 3,312,117
Patented Apr. 4, 1967

3,312,117
POWER-TRANSMISSION CHAIN LINKS
William E. Gritt, Indianapolis, Ind., assignor to Amsted Industries Incorporated, Chicago, Ill., a corporation of New Jersey
Filed Sept. 1, 1964, Ser. No. 393,638
11 Claims. (Cl. 74—250)

This invention relates to a novel linking arrangement for drive chains and, more particularly, to power-transmission chain links formed with improved tubular hooks.

One type of link for power-transmission chains is fabricated of flat stock which is permanently bent at one or both ends thereof to form an integral tubular hook of cylindrical or quasi-cylindrical cross-section. Such links may either have a rectangular opening centrally positioned for ready association with the teeth of a sprocket or be used in combination with links having sprocket-engaging openings. The adjacent links of the drive chain may be connected to the tubular hook in one of several different ways, e.g., the adjacent link may be a wire pin link having an end thereof extending through the tubular hook, the adjacent link may include spaced side bars having aligned apertures in which a pin extending through the tubular hook is supported, etc.

An important requirement for efficient drive chain operation is a high tensile strength in relation to weight. The destructive impact with the teeth of the drive sprocket, which is an inherent performance-limiting characteristic of link chains, is directly proportional to the weight of the drive chain. Heretofore, drive chains with tubular hooks suffer from the disadvantage of having relatively low strength-to-weight ratios. The tensile strength of tubular hooks of conventional designs is dependent solely upon the strength of the bent metal forming the hook, which, for a given material, is dependent upon the gauge of the flat stock.

This invention is based upon an improved drive chain link including an integral tubular hook which has a higher strength-to-weight ratio than tubular hooks of conventional chain links. Briefly, the chain links of this invention have on at least one end thereof a transverse tubular hook which is at least partly formed of a plurality, e.g., three, laterally-disposed arcuate strips. The arcuate strips are formed as integral, direct extensions of an arcuate, laterally-extending portion of the hook, or the tubular hook may be formed entirely of arcuate strips which are integral, direct extensions of the intermediate portion of the link adjacent to the tubular hook. Adjacent strips are of opposite direction of curvature from where they are integral with the remainder of the link and are formed with interengaged lateral projections and recesses in adjoining sides thereof. It will be apparent that the interengaged projection and recess feature of the link hooks fabricated in accordance with this invention prevent the laterally-disposed strips from unwrapping under load, and hence, the chain can be made stronger or of thinner gauge metal than which would be possible with bent metal without the interengaged projections and recesses.

It is, therefore, the primary object of this invention to provide a drive chain link which is formed on at least one end thereof with a tubular hook of novel construction.

Another object of this invention is to provide drive chain links with integral hooks which are stronger than tubular hooks of conventional drive chain links.

Still another object of this invention is to provide a drive chain link which includes on at least one end thereof a tubular hook formed with interengaged projections and recesses.

These and further objects of this invention will become apparent or be described as the description thereof herein proceeds and reference is made to the accompanying drawings in which:

FIGURE 1 is a plan view of a link blank cut for forming a single pitch link of this invention;
FIGURE 2 is a plan view of a chain link formed from a blank cut as illustrated in FIGURE 1;
FIGURE 3 is a side view of the link shown in FIGURE 2;
FIGURE 4 is a fragmentary isometric view of the tubular hook of a link formed from a blank cut as illustrated in FIGURE 1;
FIGURE 5 is a plan view of one end of a blank cut for fabricating another link of this invention;
FIGURE 6 is a fragmentary plan view of an assembled chain including a solid block link formed from a blank cut at both ends as illustrated in FIGURE 5;
FIGURE 7 is a side view of the chain illustrated in FIGURE 6;
FIGURE 8 is a plan view of still another method of cutting a blank for forming a link of this invention;
FIGURE 9 is an end view of a link hook formed from a blank cut as illustrated in FIGURE 8; and
FIGURE 10 is a side view of one end of a link formed from a blank cut as illustrated in FIGURE 8.

Reference is first made to FIGURES 1 to 4 for a description of a single pitch link including at one end a tubular eye formed of three strips which are extensions of an arcuate, laterally-extending section of the hook, i.e., section extending laterally across the entire width of the link. Referring more particularly to FIGURE 1, which is a plan view of a metal blank cut for forming the link, a rectangular section is cut from the center of one end of blank 10 so as to form spaced, longitudinal side bars 12. Side bars 12 are completed by rounding the free (unsupported) ends thereof, if desired, piercing aligned apertures 14 near the free ends of side bars 12, and twisting side bars 12, e.g., in opposite directions, to vertical positions (as shown in FIGURES 2 and 3).

A T-shaped section is cut from the center of the other end of blank 10 to form the two side strips 18 of tubular hook 16 (FIGURES 2 to 4). Strips 18 are L-shaped strips formed at the unsupported ends thereof with inner rectangular projections 20 defining recesses 22. The center strip 24 of tubular hook 16 is cut from blank 10 by making two longitudinal cuts 26 extending from the inner edges of side bars 12. Cuts 26 are offset laterally-inwardly intermediate the ends thereof so that strip 24 is essentially a T-shaped member having outer lateral projections 28 at the unsupported or free end thereof. Inasmuch as center strip 24 is placed between outer strips 18 during the fabrication of tubular hook 16, as hereinafter described, it will be apparent that strips 18 and 24, along with the respective projections and recesses, must be properly sized. That is, the lengths of recesses 22 are slightly longer than the lengths of projections 28 and the lateral distance between recesses 22 are slightly less than the distance between side bars 12.

After blank 10 has been cut as hereinbefore described, the link illustrated in FIGURES 2 to 4 is formed by arcuately bending principal hook section 30 (defined as the laterally-extending portion between strips 18 and 24) so that it is a continuous, arcuate extension of side bars 12. Strips 18 and 24 are then arcuately bent in opposite directions until center strip 24 is between outer strips 18 with edges of projections 28 bearing against the corresponding edges of projections 20 to increase the tensile strength of tubular hook 16 over that without the interengaged projections and recesses. If desired, side bars 12 may be twisted to vertical positions before or after tubular hook 16 is formed.

These single pitch links are interconnected with tubular hook 16 of one link being held between the side bars 12 of the adjacent link by a pin passing through the longitudinal opening within tubular hook 16 and being press-fitted in apertures 14 of the adjacent link. Therefore, the distance between the vertical ends of side bars 12 is somewhat greater than the length of tubular hook 16 of the interconnected link. In general, this link, as each of the links of this invention, is fabricated so that the axes of the tubular hooks (and the apertures 14 if the hook includes side bars 12) are in substantially the same plane as the flat intermediate section of the link. The sprocket with which the assembled chain is utilized has a thickness less than the distance between side bars 12 (adjacent to hook 16) so that the teeth of the sprocket can pass between side bars 12 and engage hook 16.

A fragmentary view of an alternative method of cutting a blank for forming a tubular hook is illustrated in FIGURE 5, wherein two longitudinal cuts 40 are made in the end of blank 42 to form side strips 44 and center strip 46. Cuts 40 are offset near the end of blank 42 to form lateral projections 48 on the unsupported end of center strip 46, with corresponding recesses in side strips 44. In addition, recesses 50 are cut in the inner edges of side strips 44 near the ends thereof integral with intermediate link portion 52. Inasmuch as projections 48 are placed within recesses 50 when the tubular hook is fabricated (as shown in FIGURES 6 and 7), it will be apparent that recesses 50 should be slightly larger than projections 48.

Reference is now made to FIGURES 6 and 7 which are fragmentary views of an assembled chain including a solid block link formed from a blank cut at both ends as illustrated in FIGURE 5. The chain is comprised of alternating formed wire pin links 54 and solid block links 56 of this invention. The solid block links 56 are comprised of a solid, flat, intermediate portion 58 having at both ends thereof tubular hooks 60 which are formed as integral extensions of intermediate portion 58. Hooks 60 are formed of strips 44 and 46 with side strips 44 having a curvature opposite that of center strip 46, i.e. side strips 44 extend around the end of interconnected pin link 54 in a direction opposite that in which center strip 46 extends. In the fabrication of tubular hooks 60, projections 48 on the end of center strip 46 are placed within recesses 50 in side strips 44 so as to increase the holding strength of tubular hooks 60. For the purpose of better illustrating the structure of tubular hooks 60 of solid block link 56, opposite views of hooks 60 are shown in FIGURES 6 and 7 at the two ends of links 56.

A still further example of a method for cutting a blank for a link of this invention is illustrated in FIGURE 8, wherein spaced cuts 70 are made in an end of blank 72 to form side strips 74 and center strip 76. Cuts 70 are shaped so as to provide side strips 74 with rectangular projections 78 intermediate the ends thereof and center strip 76 with opposing recesses corresponding to projections 78. These recesses in center strip 76 form projections 80 at the free end of center strip 76. If desired, side strips 74 may be cut (as along the dotted lines) to remove the free ends of side strips 74 beyond projections 78.

Although the fabrication of the hooks has been hereinbefore described as merely bending (i.e., permanently deforming) adjacent strips in opposite directions so that they are in the same cylindrical or quasi-cylindrical plane and placing the projection formed on one of the adjacent strips within the recess in the other adjacent strip, it will be apparent that the fabrication of the hooks is not so limited. The tubular hooks may also be fabricated by placing each of the projections (e.g., projections 78 and 80 of FIGURE 8) behind the adjacent strip so that adjacent strips are interlocked with one another at the inside corners of the inner transverse edges of the projections. Inasmuch as there is an overlapping of the adjoining sides of adjacent strips, it will be apparent that the length of the hook thus formed is less than the length of the hook formed by placing the projections within the recesses as hereinbefore described.

This latter method of fabricating a tubular hook from a blank cut as shown in FIGURE 8 is best described by reference to FIGURES 9 and 10 which are end and side views of a link hook thus formed. In referring to FIGURE 9 it can be seen that tubular hook 82 is formed by placing projections 78 of side strips 74 behind center strip 76 and projections 80 of center strip 76 behind side strips 74 so that strips 74 and 76 are interlocked at points 84 to prevent hook 82 from unwrapping.

Tubular hooks formed as illustrated in FIGURES 8 and 9 may be loaded primarily in tension so that only the interlocking projections prevent the hook from unwrapping. In contradistinction, the hooks illustrated in FIGURES 1 to 4 and 5 to 7 are prevented from unwrapping both by the strength of the bent metal forming the strips and the projections disposed within recesses. Since a chain comprised of links formed with hooks loaded in tension may be made in one continuous strand, as in a punch press, it must be broken for handling, changing the length thereof, and the like. A connecting link for such a chain may take the form of a roller chain link comprising a pair of spaced side plates between which a pair of spaced lateral pins are removably supported.

For the purpose of this specification and the appended claims, the term "interengaged projections and recesses" is intended to include the hooks formed by placing a projection of one strip in a corresponding recess in an adjacent strip (as shown in FIGURES 2 to 4 and FIGURES 6 and 7), as well as the interlocking feature shown in FIGURES 9 and 10. Furthermore, the term "laterally-disposed" as used to describe the realtive position of strips forming at least part of a tubular hook is intended to include strips which are juxtaposed to each other in the same plane (as shown in FIGURES 2 to 4) as well as those which have overlapping adjoining sides (as shown in FIGURES 9 and 10). The term "bent" as used to describe the portions of the tubular hooks is meant to include portions of the tubular hooks which are permanently deformed to an arcuate or quasi-arcuate shape as well as those which are held under tension in an arcuate shape by the interlocking feature described with respect to FIGURES 9 and 10.

I claim:

1. A chain link, formed of a blank of sheet metal, having on at least one end a transverse tubular hook formed of a plurality of laterally-disposed curved strips in at least a part thereof, said strips being integral, direct extensions of a laterally-extending portion of said link, adjacent strips being of opposite curvature from where they are integral with said portion and formed with interengaged projections and recesses in adjoining sides thereof.

2. A chain link, formed of a blank of sheet metal, having on at least one end a transverse tubular hook formed of a plurality of laterally-disposed curved strips in at least a part thereof, each of said strips being an integral, direct extension of the same laterally-extending portion of said link, adjacent strips being of opposite direction of curvature from where they are integral with said portion and formed with interengaged projections and recesses in adjoining sides thereof.

3. A chain link, formed of a blank of sheet metal, having on at least one end a transverse tubular hook adjacent to a flat, intermediate portion of said link, said hook formed of a plurality of laterally-disposed, arcuate strips which are integral, direct extensions of said intermediate portion, adjacent strips being of opposite curvature from where they are integral with said portion and formed with interengaged projections and recesses in adjoining sides thereof.

4. A chain link, formed of a blank of sheet metal, having on at least one end a tubular hook adjacent to a flat, intermediate portion of said link, the axis of said hook and said intermediate portion being in a common plane, said hook formed of three, laterally-disposed, arcuate strips which are integral, direct extensions of said intermediate portion, the side strips having a curvature opposite that of the center strip, adjacent strips being formed with interengaged projections and recesses.

5. A chain link, formed of a blank of sheet metal, having on at least one end a tubular hook adjacent to a flat, intermediate portion of said link, the axis of said hook and said intermediate portion being in a common plane, said hook formed of three, laterally-disposed, arcuate strips which are integral, direct extensions of said intermediate portion, the side strips having a curvature opposite that of the center strip, said center strip having lateral projections interengaged with lateral recesses in said side strips.

6. A chain link, formed of a blank of steel metal, comprising a flat intermediate portion supporting at each end thereof a laterally-extending, tubular hook having the axis thereof in the same plane as said intermediate portion, said tubular hooks being formed of a plurality of laterally-disposed, arcuate strips which are integral, direct extensions of said intermediate portion, adjacent strips being of opposite direction of curvature from where they are integral with said intermediate portion and formed with interengaged projections and recesses in adjoining sides thereof.

7. A chain link, formed of a blank of sheet metal, comprising a pair of spaced, longitudinal side bars supporting at one end a laterally-extending tubular hook, said hook including an arcuate member extending beyond the space between said side bars and formed as a direct extension of said side bars and three, laterally-disposed, arcuate strips formed as direct extensions of said arcuate member, the center strip being struck from the metal between said side bars and having a curvature opposite that of the side strips, one strip of each pair of adjacent strips having a lateral projection interengaged with a recess in the other strip of the pair of adjacent strips.

8. A chain link, formed of a blank of sheet metal, comprising two spaced side bars supporting at one end a laterally-extending tubular hook including an arcuate member formed as an integral extension of said side bars and three, laterally-disposed, arcuate strips formed as integral extensions of said arcuate member, the two side strips being aligned with said side bars and having a directioon of curvature opposite that of the center strip, said center strip being struck from the metal between said side bars and having lateral projections disposed within recesses in said side strips.

9. A chain link, formed of a blank of sheet metal comprising two spaced side bars supporting at one end thereof a laterally-extending tubular hook including an arcuate member formed as an integral extension of said side bars and three, laterally-disposed, arcuate strips formed as integral extensions of said arcuate members, said side bars and the center strip being integral with said arcuate member on the edge of said arcuate member opposite that which the side strips are integral therewith, said center strip having lateral projections disposed within recesses in said side strips.

10. A single pitch chain link, formed of a blank of sheet metal, comprising a pair of spaced, longitudinal side bars supporting at one end thereof a transverse tubular hook having an axis extending beyond the space between said side bars, said tubular hook including an arcuate member formed as an integral extension of said side bars and three, laterally-disposed, arcuate strips formed as integral extensions of said arcuate member with adjacent strips being provided with interengaged projections and recesses, the side strips being integral with said arcuate member on the axially-extending edge thereof opposite that which the center strip and side bars are integral therewith, said center strip being struck from the metal between said side bars, said side bars being twisted so that the ends thereof adjacent to said tubular hook and the axis of said tubular hook are in the same plane and the ends thereof remote from said tubular hook are normal to said plane, the ends of said side bars remote from said tubular hook being spaced a distance greater than the length of said tubular hook and provided with aligned apertures having axes in said plane and parallel to the axis of said tubular hook.

11. In a chain link fabricated of a blank of sheet metal having on at least one end thereof an integral, laterally-extending tubular hook, the improvement wherein said hook is formed in at least a part thereof of a plurality of laterally-disposed, arcuate strips integral at one end with a transverse portion of said link with adjacent strips having alternating directions of curvature from where they are integral with said transverse portion and being provided with interengaged projections and recesses in adjoining sides thereof.

References Cited by the Examiner

UNITED STATES PATENTS

| 2,758,483 | 8/1956 | David | 74—250 |
| 2,811,857 | 11/1957 | Willaver et al. | 74—250 |
| 3,189,164 | 6/1965 | Robinson et al. | 74—250 |

FOREIGN PATENTS

| 23,316 | 7/1962 | Germany. |

OTHER REFERENCES

Locke Steel Belt Company, Bridgeport, Conn., Special Catalogue No. 6, copyright 1962.

DAVID J. WILLIAMOWSKY, *Primary Examiner.*

H. S. LAYTON, *Assistant Examiner.*